US012299165B1

United States Patent
Oliver

(10) Patent No.: US 12,299,165 B1
(45) Date of Patent: May 13, 2025

(54) METHOD OF REQUESTING ACCESS TO INFORMATION ELEMENTS WITH PRIVACY CONTROL

(71) Applicant: Jeffrey Gerome Oliver, Richmond, TX (US)

(72) Inventor: Jeffrey Gerome Oliver, Richmond, TX (US)

(*) Notice: Subject to any disclaimer, the term of this patent is extended or adjusted under 35 U.S.C. 154(b) by 166 days.

(21) Appl. No.: 17/701,136

(22) Filed: Mar. 22, 2022

(51) Int. Cl.
| | | |
|---|---|---|
| G06F 21/62 | (2013.01) | |
| G06Q 10/1053 | (2023.01) | |
| G06F 3/16 | (2006.01) | |
| G06F 21/60 | (2013.01) | |
| G06K 9/00 | (2022.01) | |
| G06Q 10/10 | (2023.01) | |

(52) U.S. Cl.
CPC ..... G06F 21/6245 (2013.01); G06Q 10/1053 (2013.01); *G06F 21/60* (2013.01); *G06F 21/6254* (2013.01)

(58) Field of Classification Search
CPC .. G06F 21/6245; G06F 21/60; G06F 21/6254; G06Q 10/1053
See application file for complete search history.

(56) References Cited

U.S. PATENT DOCUMENTS

| | | | |
|---|---|---|---|
| 2017/0220999 A1* | 8/2017 | Follis | G06Q 10/103 |
| 2018/0232751 A1* | 8/2018 | Terhark | G06Q 10/063118 |
| 2020/0143329 A1* | 5/2020 | Gamaliel | H04N 21/45455 |

OTHER PUBLICATIONS

"Anonymous Recruitment Will Dominate in 2021, Here's Why"—Side Search, Oct. 1, 2021 https://www.sidesearch.com/blog-admin/anonymous-recruitment-will-dominate-in-2021-heres-why (Year: 2021).*
"Blind Recruitment: How Anonymous Hiring Improves Diversity"—Jess Stainer, Pinpoint, Aug. 5, 2021 https://www.pinpointhq.com/insights/blind-recruitment/#what-is-blind-recruitment (Year: 2021).*

* cited by examiner

*Primary Examiner* — Randy A Scott
(74) *Attorney, Agent, or Firm* — Kearney, McWilliams & Davis, PLLC; Dileep Rao

(57) ABSTRACT

A computer implemented method for anonymously showcasing qualifications, including talents, knowledge, skills, and experience. The method can include steps to allow a user to input personal information, store the personal information in a searchable database, allow the user to identify which personal information elements are accessible by interested, allow each interested party to search accessible information elements, allow each interested party to request access to inaccessible information elements, notify the user of a request for access to inaccessible information elements by a specific interested party, and allow the user to selectively grant access to inaccessible information elements to the specific interested party. The user can, in this manner, maintain complete control of personal information and ensure anonymity. Correspondingly, the interested party can evaluate users without bias.

6 Claims, 1 Drawing Sheet

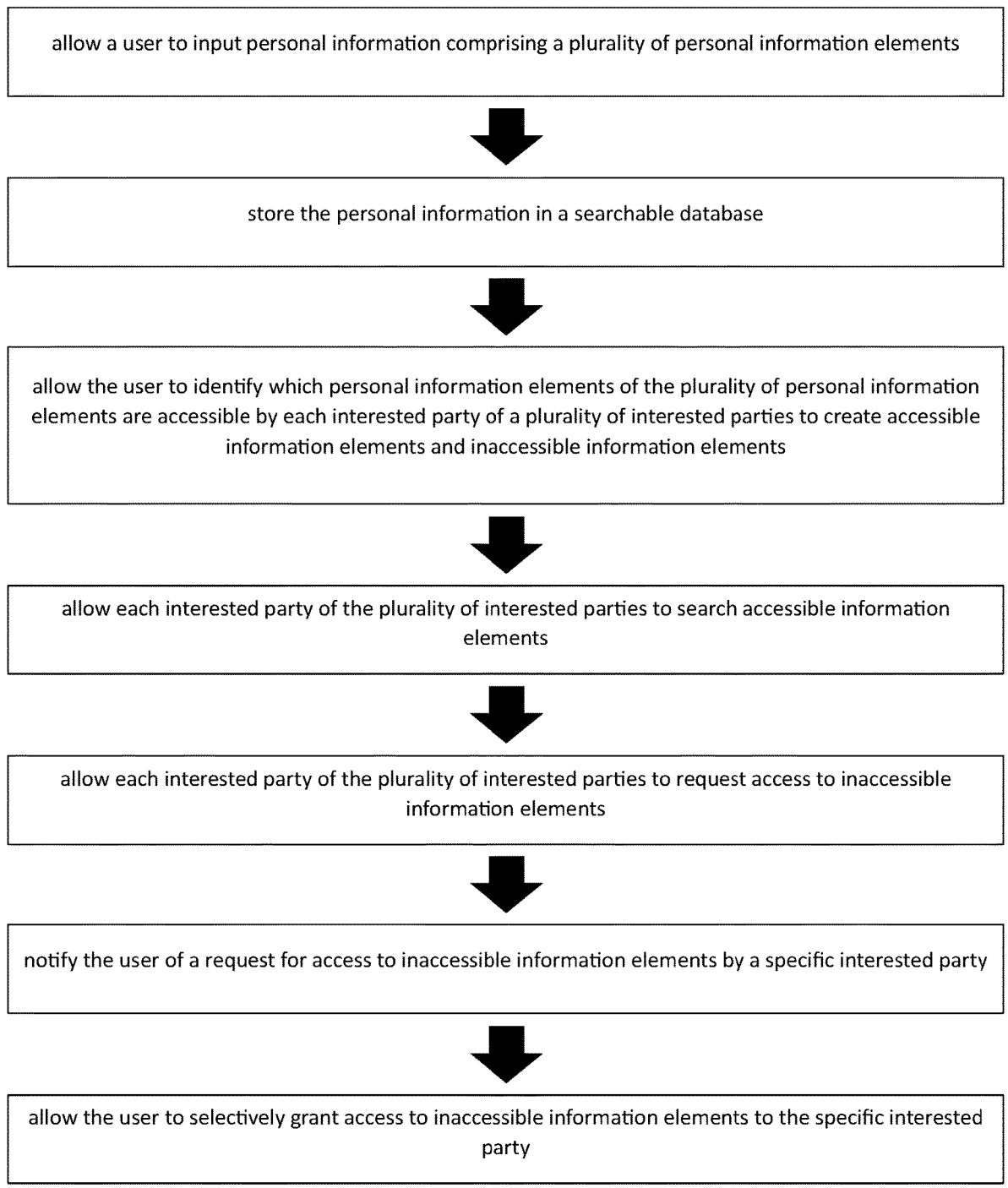

METHOD OF REQUESTING ACCESS TO INFORMATION ELEMENTS WITH PRIVACY CONTROL

FIELD

The present disclosure generally relates to a computer implemented method for anonymously showcasing talents, knowledge, skills, and experience.

BACKGROUND

It is often desirable for a person to showcase their talents, knowledge, skills, and experience to others for a variety of reasons. Whether it is for the purpose of applying for a job opening, a scholarship, a contract, or the like, persons or organizations would often like to showcase their talents.

In many of these situations, it is desirable to do so in an anonymous fashion. For example, a job seeker may not wish to have their full resume accessible over the internet, or otherwise risk their present employer to find out that they are seeking other employment. A foundation issuing scholarships may wish to eliminate bias by not knowing race, gender, or other factors while evaluating candidates.

Presently, recruiters will often obfuscate personal or identifying information when presenting candidate information to organizations looking for candidates. However, this necessarily means that the recruiter knows the identity of the individual or organization which is being proposed as a candidate. The recruiter themselves can, therefore, incorporate bias either intentionally or unintentionally, or even release information about a candidate without the candidate's approval.

In other situations, bias can be incorporated when people apply for small business loans, mortgages, credit cards, club memberships, and the like. It may be desirable for the applicant to remain anonymous, but in other situations, organizations looking for candidates may wish the candidates to remain anonymous in order to eliminate bias and enable diverse personnel without actively applying reverse bias as is presently necessary.

Currently, therefore, it is impossible to eliminate bias (whether intentional or not) because the identity of the candidate and/or applicant is always known to some other party or the decision maker when showcasing talents, knowledge, skills, and experience.

It is desirable therefore, to have a methodology and a system for anonymously showcasing qualifications, including talents, knowledge, skills, and experience. Furthermore, it is essential for the method to be computer implemented in order to maintain anonymity of the person showcasing qualifications, including talents, knowledge, skills, and experience.

The present disclosure provides a computer implemented method to accomplish the above goal.

BRIEF DESCRIPTION OF THE DRAWING

The Figure illustrates the steps of one embodiment of the method.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relates to a computer implemented method for anonymously showcasing qualifications, including talents, knowledge, skills, and experience.

The computer implemented method for anonymously showcasing qualifications, including talents, knowledge, skills, and experience, can have a computer having a processor, non-transitory data storage medium, and computer instructions stored on the non-transitory data storage medium.

For the purpose of this disclosure, "computer" shall refer to any device with a microprocessor capable of executing instructions. Exemplary devices include tablets, laptop computers, desktop computers, smart phones, combinations thereof, and the like.

Non-transitory data storage medium as used herein shall refer to computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The computer instructions can cause the processor to allow a user to input personal information comprising a plurality of personal information elements, store the personal information in a searchable database, allow the user to identify which personal information elements of the plurality of personal information elements are accessible by a plurality of interested parties to create accessible information elements and inaccessible information elements, allow each interested party of the plurality of interested parties to search accessible information elements, allow each interested party of the plurality of interested parties to request access to inaccessible information elements, notify the user of a request for access to inaccessible information elements by a specific interested party, and allow the user to selectively grant access to inaccessible information elements to the specific interested party.

A user can create a profile having any pertinent information that the user wishes to showcase. The user can be an individual, a member or members, a group, or an organization that wishes to highlight or advertise qualifications, including talents, knowledge, skills, and experience without being identified. The profile can be comprised of personal information elements and stored on a non-transitory data storage medium. The information can be stored in a searchable database.

The user can upload existing documents, such as resumes, curriculum vitae, research papers, patents, publications, and the like. Using existing technology, a system for conducting the computer implemented method of the present disclosure can utilize character recognition to input the data into the user's profile.

The user can then determine which personal information elements can be accessed by an interested party and which elements are kept confidential, i.e., only the user can access the confidential elements. Elements such as name, address, current employer, author, references, and the like can be designated as inaccessible personal information elements.

Personal information elements can include any historical data, summary of skills, certifications, identifying information and the like. A non-exhaustive list of exemplary personal information elements includes: a name, an address, a phone number, an email address, a website address, a personal summary, any information stored and/or showcased in a digital fashion or on social media, a present company name, a previous company name, a present company address, a previous company address, a present company job title, and a previous company job title.

An interested party can be any party looking for specific talents, knowledge, skills, or experience. The interested party can be a recruiter, an employer, an issuer of a scholarship, a manager of a contest, a bank, a person or party looking to fill a vacancy or opportunity, or any person or organization needing to find users with specific talents, knowledge, skills, and experience.

Any interested party can be allowed to search the database storing personal information elements. However, only personal information elements made accessible by the user are searchable and/or readable by the interested party. The user can maintain accessible personal information elements (searchable by interested party) and inaccessible personal information elements (not searchable or viewable by interested party).

In embodiments, the user can categorize interested parties and make different personal information elements accessible or inaccessible to each category of interested parties.

When an interested party finds pertinent or desirable personal information elements based upon its database search, the specific interested party can request access to inaccessible elements from the user. The user can then selectively determine whether to grant access to the specific interested party. The user can also revoke access for inaccessible information elements to the specific interested party at a later time if desired. In embodiments, the user can grant access or revoke access at any time.

Specific interested parties can send a message to the user to pose specific questions or convey information. The user can then then anonymously respond through the system. The specific interested party can also request access to inaccessible elements. The system can send a notification to the user, who can then make the determination about whether or not to grant access to the specific interested party. In embodiments, the user can determine which inaccessible elements they allow the specific interested party to access.

The Figure illustrates the steps of one embodiment of the method.

An exemplary application of the method is described below:

Jeff is a computer programmer that is currently employed. He is unsure of whether his compensation is proper for his experience level and responsibilities. He would like to explore the job market, but he does not want his employer to find out that he is seeking other offers and information.

Jeff creates a profile and uploads his resume. However, identifying information, such as name, address, employer name, and the like can be made inaccessible personal information elements. Jeff can, in this manner, highlight his talents, knowledge, skills, and experience completely anonymously.

Interested parties can search for specific skills, job titles, experience, and the like to fill vacancies or opportunities. In embodiments, the system can search uploaded documents, such as resumes, curriculum vitae, research papers, patents, publications, and the like for key words and terms to generate results, but still maintain the uploaded documents as inaccessible personal information elements.

Oliver, a hiring manager at a software development company searches the database for his desired skills and comes across Jeff's profile. Oliver feels Jeff might be a good fit, but as of yet does not actually know Jeff's identity or any identifying information.

Oliver sends a notification to Jeff requesting access to other inaccessible elements or sends a message asking specific questions of Jeff and shares details about the role he is looking to hire for. Jeff can respond anonymously with answers to the questions, respond anonymously with questions of his own, or grant selective access to inaccessible personal information elements to Oliver. Jeff can determine his appropriate action based upon the interested party. In this instance, Jeff can determine whether it is reasonable to release information to Oliver.

In this manner, both Jeff and Oliver have efficiently and effectively interacted to fill a position. Jeff was able to anonymously explore the job market without danger of his employer finding out or other undesired repercussions. Oliver was able to search to fill a vacancy without any bias and with a pure focus on qualifications, including talents, knowledge, skills, and experience to make a determination of whom to contact.

An exemplary application of the method is described below:

Ava applies for a small business loan. The bank she has applied to has historically been alleged to have racial bias and, therefore, is reviewing applications with limited applicant information. Ava need not divulge her name, ethnicity, gender, or other elements which may engender bias in the bank's review process. The bank now can objectively evaluate Ava purely based upon the financial history and merits of Ava's business.

Utilizing the system to enact the computer implemented method of the present disclosure, users can remain anonymous when attempting to showcase qualifications, including talents, knowledge, skills, and experience. Furthermore, organizations looking to fill vacancies or determine eligibility for items such as loans, can choose to evaluate candidates anonymously in order to eliminate bias. This would allow for diversity in hiring and in any selection process without the need to incorporate artificial elements such as quotas or an intentional reverse bias.

While the present disclosure emphasizes the presented embodiments and FIGURES, it should be understood within the scope of the appended claims, the disclosure might be embodied other than as specifically enabled herein.

What is claimed is:

1. A computer implemented method for anonymously showcasing qualifications, including talents, knowledge, skills, and experience wherein the method is implemented by: a computer having a processor, non-transitory data storage medium, and computer instructions stored on the non-transitory data storage medium, and further wherein the computer instructions cause the processor to:
   a) allow a user to input personal information comprising a plurality of personal information elements, wherein the personal information elements comprise at least one of:
      (i) a name;
      (ii) an address;
      (iii) a phone number;
      (iv) an email address;
      (v) a website address;
      (vi) a personal summary;
      (vii) an internet profile;
      (viii) a present company name;
      (ix) a previous company name;
      (x) a present company address;
      (xi) a previous company address;
      (xii) a present company job title; or
      (xiii) a previous company job title;
   b) store the personal information in a searchable database;
   c) allow the user to identify which personal information elements of the plurality of personal information elements are accessible by each interested party of a plurality of interested parties to create accessible information elements and inaccessible information elements, wherein the user can specify different personal information elements for each interested party of the plurality of interested parties, and further wherein the interested parties are recruiters, hiring managers, employers, or any persons looking to fill a vacancy or opportunity;
   d) allow each interested party of the plurality of interested parties to search accessible information elements;
   e) allow each interested party of the plurality of interested parties to request access to inaccessible information elements;
   f) notify the user of a request for access to inaccessible information elements by a specific interested party;
   g) allow the user to selectively grant access to inaccessible information elements to the specific interested party;
   wherein personal information comprises at least one of:
   a name, an address, a phone number, an email address, a website address, a personal summary, an internet profile, a present company name, a previous company name, a present company address, a previous company address, a present company job title, or a previous company job title, and
   wherein the interested parties are recruiters, hiring managers, employers, or any persons looking to fill a vacancy or opportunity.

2. The computer implemented method of claim 1, wherein the plurality of interested parties is divided into categories by the user.

3. The computer implemented method of claim 1, further comprising computer instructions stored on the non-transitory data storage medium causing the processor to allow the user to revoke access to inaccessible information elements to the specific interested party.

4. The computer implemented method of claim 1, further comprising computer instructions stored on the non-transitory data storage medium causing the processor to allow each interested party of the plurality of interested parties to send a private message to the user.

5. The computer implemented method of claim 2, wherein the user identifies accessible information elements specific to each category of interested parties.

6. The computer implemented method of claim 4, further comprising computer instructions stored on the non-transitory data storage medium causing the processor to allow the user to respond to each interested party of the plurality of interested parties.

* * * * *